United States Patent

Cerruti et al.

(10) Patent No.: US 9,009,472 B2
(45) Date of Patent: Apr. 14, 2015

(54) PROVIDING CONSISTENT CRYPTOGRAPHIC OPERATIONS

(75) Inventors: Julian Ariel Cerruti, Buenos Aires (AR); Mariela Claudia Lanza, Capital Federal (AR); Guillermo Manzato, Capital Federal (AR); Mariano Alejandro Prediletto, Capitol Federal (AR); James J. Whitmore, Carlisle, PA (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 13/272,797

(22) Filed: Oct. 13, 2011

(65) Prior Publication Data

US 2013/0097432 A1    Apr. 18, 2013

(51) Int. Cl.
*H04L 29/06* (2006.01)
*G06F 21/60* (2013.01)
*H04L 9/14* (2006.01)

(52) U.S. Cl.
CPC .............. *G06F 21/602* (2013.01); *H04L 9/14* (2013.01)

(58) Field of Classification Search
CPC ....... G06F 21/00; G06F 21/60; G06F 21/602; G06F 21/606; G06F 21/6209; G06F 21/64; G06F 21/645; G06F 2221/2125; H04L 9/14; H04L 2209/38; H04L 63/0428–63/0478; H04L 63/10–63/108; H04L 63/12–63/126; H04L 2463/041
USPC ......... 713/150–152, 160–161, 164, 167, 176; 726/1; 709/228, 236, 246
See application file for complete search history.

(56) References Cited

U.S. PATENT DOCUMENTS

| | | | |
|---|---|---|---|
| 5,991,877 A | 11/1999 | Luckenbaugh | |
| 6,321,201 B1 | 11/2001 | Dahl | |
| 6,449,720 B1 * | 9/2002 | Sprague et al. | 713/171 |
| 6,567,808 B1 * | 5/2003 | Eschelbeck et al. | 1/1 |
| 7,103,773 B2 | 9/2006 | Erickson et al. | |
| 7,260,555 B2 | 8/2007 | Rossmann et al. | |
| 7,340,611 B2 * | 3/2008 | Alev et al. | 713/180 |
| 7,516,333 B2 | 4/2009 | Yunis et al. | |
| 7,698,398 B1 * | 4/2010 | Lai | 709/223 |
| 8,472,987 B2 * | 6/2013 | Bhatnagar | 455/466 |
| 8,473,740 B2 * | 6/2013 | Vion-Dury | 713/167 |
| 2004/0168064 A1 | 8/2004 | Shimizu et al. | |
| 2004/0186998 A1 | 9/2004 | Kim et al. | |
| 2005/0081063 A1 * | 4/2005 | Patrick et al. | 713/201 |

(Continued)

*Primary Examiner* — Saleh Najjar
*Assistant Examiner* — Eric W Shepperd
(74) *Attorney, Agent, or Firm* — Garg Law Firm, PLLC; Rakesh Garg; Parashos T. Kalaitzis

(57) ABSTRACT

A method, system, and computer usable program product for providing consistent cryptographic operations in a data processing environment using protected structured data objects are provided in the illustrative embodiments. A data input is received from an originating application by a security plug-in, both the application and the security plug-in executing in the data processing system. A security schema object is received by the security plug-in, the security schema object describing a sequence of cryptographic operations, wherein the security schema object includes a plurality of components each component describing an aspect of the cryptographic operations. The data input is transformed into a secure structured data object by the security plug-in using the sequence of cryptographic operations. A property of the secure structured data object is populated using data about the security schema object. The secure structured data object is transmitted to a consumer application.

20 Claims, 9 Drawing Sheets

(56) References Cited

U.S. PATENT DOCUMENTS

| | | |
|---|---|---|
| 2005/0144457 A1 | 6/2005 | Lee et al. |
| 2005/0273772 A1* | 12/2005 | Matsakis et al. ............... 717/136 |
| 2006/0026667 A1 | 2/2006 | Bhide et al. |
| 2006/0155529 A1* | 7/2006 | Ludviksson et al. ............... 704/4 |
| 2006/0161502 A1* | 7/2006 | Cerruti et al. ................... 705/71 |
| 2006/0265689 A1* | 11/2006 | Kuznetsov et al. ........... 717/117 |
| 2007/0283150 A1 | 12/2007 | Cozianu |
| 2008/0010348 A1* | 1/2008 | Dawson et al. ................ 709/206 |
| 2008/0270802 A1 | 10/2008 | Ashley et al. |
| 2009/0282423 A1* | 11/2009 | Smith et al. .................... 719/328 |
| 2009/0319776 A1* | 12/2009 | Burch et al. .................... 713/155 |
| 2012/0005570 A1* | 1/2012 | Hughes .......................... 715/234 |
| 2012/0159306 A1* | 6/2012 | Sharma et al. ................. 715/234 |
| 2012/0290837 A1* | 11/2012 | Vion-Dury ..................... 713/167 |
| 2013/0254690 A1* | 9/2013 | Stevens et al. ................. 715/765 |
| 2014/0049796 A1* | 2/2014 | Alleshouse .................. 358/1.15 |

* cited by examiner

PROVIDING CONSISTENT CRYPTOGRAPHIC OPERATIONS

RELATED APPLICATION

The present invention is related to similar subject matter of co-pending commonly assigned U.S. patent application Ser. No. 13/272,967 entitled "PROVIDING CONSISTENT CRYPTOGRAPHIC OPERATIONS ACROSS SEVERAL APPLICATIONS," filed on Oct. 13, 2011, which is hereby incorporated by reference.

BACKGROUND OF THE INVENTION

1. Field of the Invention

The present invention relates generally to an improved data processing system, and in particular, to a computer implemented method for improving data security. Still more particularly, the present invention relates to a computer implemented method, system, and computer usable program code for providing consistent cryptographic operations in a data processing environment using protected structured data objects.

2. Description of the Related Art

Modern data processing systems and software have standards and techniques to facilitate interoperability. One technique that promotes interoperability of information is organizing information in a well-defined organization or structure, using a commonly known computer readable language.

One example of such a technique is a "markup language". Extensible Markup Language (XML) is one example of a markup language. XML provides a standard framework for creating data objects. A data object is an organization of data according to a defined structure. An XML data object can be self-defining. In other words, XML provides a definition of a structure that included data follows, followed by the data according to that defined structure. XML provides a way to convey data in a human readable form as well as in a computer usable form.

Information about data is commonly referred to as meta-data. Some examples of meta-data are the structure and characteristics of data as described in XML. A data object that includes both data and meta-data is commonly referred to as a structured data object.

Modern computing systems that process structured data do so via software components. The software components for creating and conveying structured data objects are often paired with software components that receive and consume those structured data objects. These software components must have a common understanding of how to handle the given structured data object in order to inter-operate.

As the contents of structured data objects and meta-data have increased in complexity, the software components to create, convey, and consume the structured data objects have also become increasingly complex. One example necessity that has contributed to the increasing complexity is the concern with data security. Presently, standards exist to support cryptographic protections of data. For example, key-pair encryption and digital certificates can presently be used to encrypt data.

SUMMARY OF THE INVENTION

The invention provides a method, system, and computer usable program product for providing consistent cryptographic operations in a data processing environment. A data input from an originating application is received by a security plug-in. Both the application and the security plug-in execute in the data processing system. A security schema object is received by the security plug-in, the security schema object describing a sequence of cryptographic operations, wherein the security schema object includes a plurality of components, each component describing an aspect of the cryptographic operations. The data input is transformed into a secure structured data object by the security plug-in using the sequence of cryptographic operations. A property of the secure structured data object is populated using data about the security schema object, so that the security schema object may be used for future operations on the secure structured object. The secure structured data object is transmitted to a consumer application which may be the originating application or another application.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
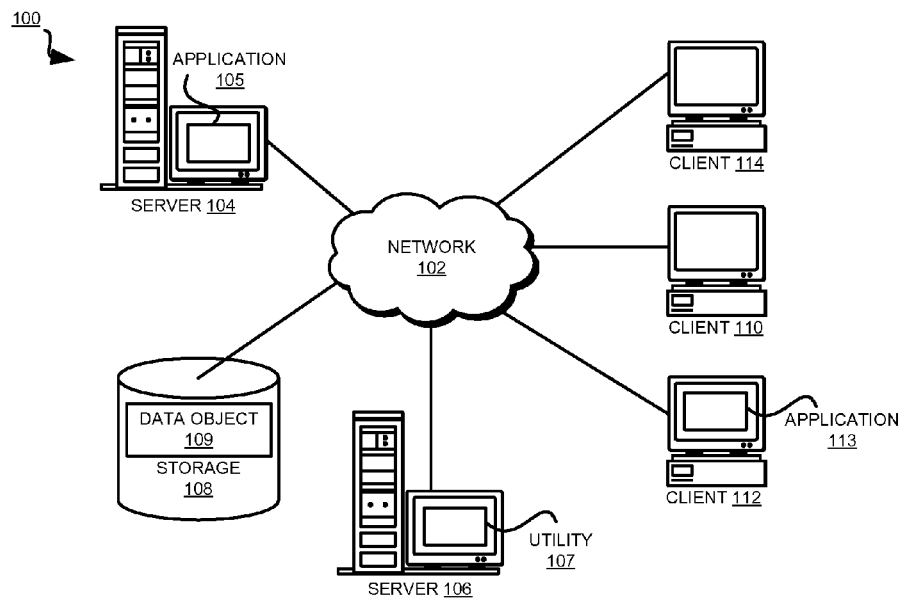
FIG. 1 depicts a pictorial representation of a network of data processing systems in which illustrative embodiments may be implemented.

The inventors recognized that adding cryptographic protection to structured data objects creates other issues. For example, a variety of data security techniques exist that can be employed for securing data. As a result, software designed to handle encrypted structured data has to accommodate at least a reasonably large number of popular security methods to be sufficiently inter-operable. Consequently, adding cryptographic protections to structured data objects causes increase in the complexity of the software that create or consume such structured data objects. Those programmers experienced in application programming are not necessarily well versed in cryptographic mechanisms.

The invention further recognizes that different data objects and portions within them may have to be secured differently. For example, assume that a data object includes a software installation package. For example, software documentation is not considered valuable or containing trade secrets, and can be left in plain text form. The binary code of the software, however, has to be encrypted to prevent piracy thereof.

The binary portion of the example data object may be the largest single portion of the example data object. Therefore, encrypting the binary portion with a computationally intensive encryption algorithm can cause performance degradation when the binary data is to be used, such as when the software is installed. A computationally intensive encryption on the binary portion may also cause the installer in the data object to increase in complexity. Experts in the installation field are not often experts in the cryptography field as well.

On the other hand, the license file in the data object may be relatively small and can be encrypted with the strongest available encryption regardless of the computational intensity of such encryption. Accordingly, the invention recognizes that different parts of a structured data object benefit from applying different security strategies to the different parts.

The inventors further recognize that data security technologies evolve and change over time. Present software designed to handle secure structured data objects is preferably easily modifiable to address future changes in security operations used in the creation of the structured data objects. Secured structured data objects are also referred to as protected data objects in this disclosure. Backwards compatibility with sources of structured data objects is also desirable. These types of issues give rise to increasing complexity of the security portion of the software, diverting more and more resources of application software writers away from developing central functions and towards data security issues.

The illustrative embodiments used to describe the invention generally address and solve the above-described problems and other problems related to data security of structured data objects. The illustrative embodiments provide a method, computer usable program product, and data processing system for providing consistent cryptographic operations in a data processing environment using protected structured data objects.

The invention enables consistent cryptographic operations in a data processing environment by utilizing a security schema object that describes the cryptographic operations, which should be performed with a particular secure structured data object. These operations include mechanisms for ensuring that the cryptographically secured data in secured data objects is unaltered or unchanged from the form the sender of the secured data object intended. In some embodiments, the security schema object allows different security measures to be implemented with different data being transported within the secure structured data object.

The invention allows applications which process a secure structured data object to utilize the services of one or more security utilities for handling cryptographic operations which create the secure structured data object without actual knowledge of the type of security operation or the circumstances or configuration in which the security is being applied.

Another embodiment allows application software to verify the integrity of a secure structured data object and restore all or part of a secure structured data object to the original non-encrypted content. This embodiment of the invention also allows the application software to remain unaware of the configuration or the type of security employed in the secure structured data object.

Because the details of the cryptographic operations are contained in the security schema object and carried out by the security utility or plug-in, the invention further allows a data processing environment to implement changes to security infrastructure without having to make code changes to numerous software applications that provide or consume structured data objects.

An application implementing an embodiment of the invention can take the form of data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, an embodiment of the invention can be implemented. (Java, JVM, EJB, and other Java related terminologies are registered trademarks of Sun Microsystems, Inc. or Oracle Corporation in the United States and other countries.) The security schema object and secure structured data object are described with respect to XML, however, those skilled in the art would understand that other languages can be used to create the data objects.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
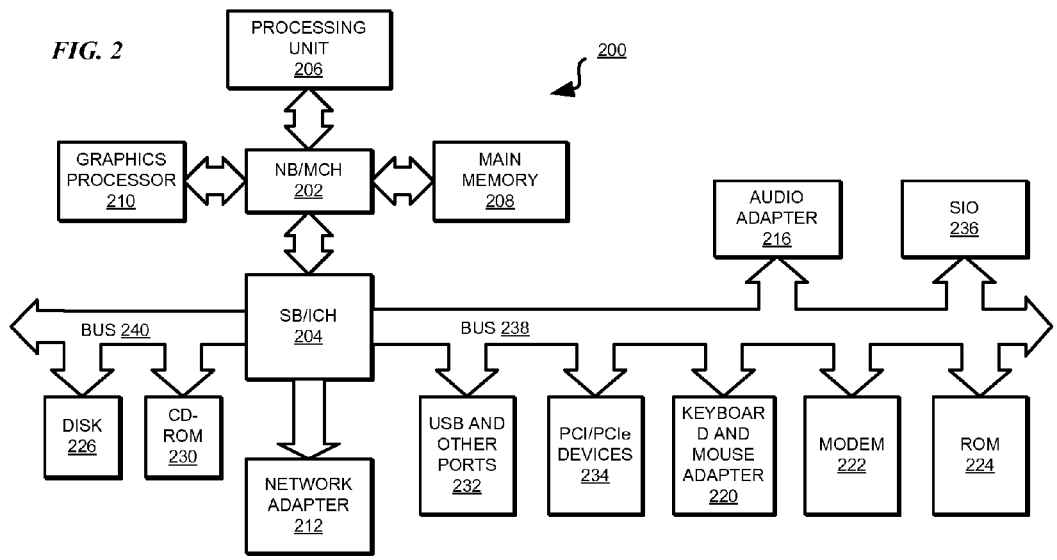
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments can be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments can be implemented. Data processing environment 100 is an example network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 includes application 105. Server 106 includes utility 107. Utility 107 includes an example implementation of an embodiment of the invention. Storage 108 includes data object 109. Data object 109 is a structured data object produced by an application, such as application 105 in server 104. Client 112 includes application 113. Application 113 may be an application that produces or consumes structured data objects.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
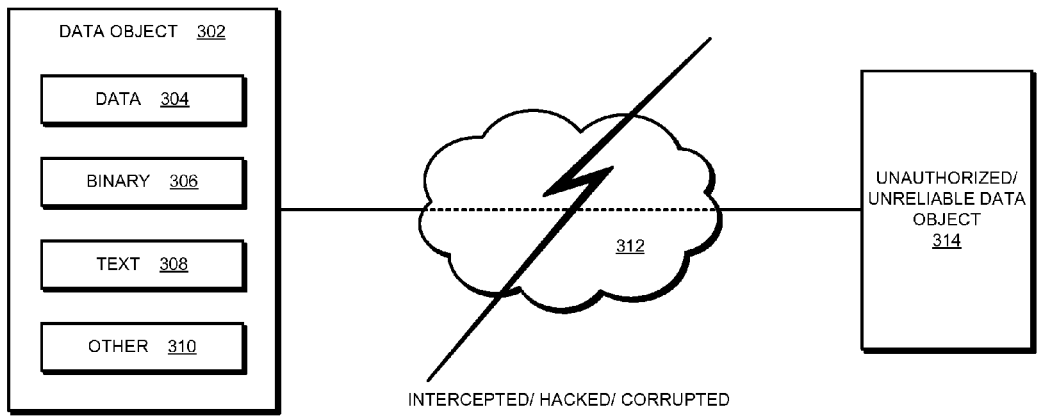
FIG. 3 depicts a block diagram of a security issue related to structured data objects with respect to which an illustrative embodiment can be implemented.

With reference to FIG. 3, this figure depicts a block diagram of a structured data object with which an illustrative embodiment of the invention can be implemented. Data object 302 is a structured data object, similar to data object 109 in FIG. 1.

Data object 302 includes several parts of various types. As an example, data object 302 is shown to include data 304, binary 306, text 308, and other data 310. In one embodiment, data 304 is plaintext data; binary 306 is machine readable binary code of an executable file; text 308 is a readme file or other documentation; and other data 310 is any type of data, such as a machine and human readable data structure.

When data object 302 is transmitted, such as from a source of a structured data object to a consumer of the structured data object, data object 302 is communicated over data network 312. Data object 302 may be susceptible to being intercepted, hacked, corrupted, or otherwise manipulated. For example, if data object 302 were a software installation package, an unauthorized user may intercept data object 302 for unauthorized use. As another example, a malicious user may intercept data object 302 and read a license code therein for use elsewhere. As another example, data object 302 may be corrupted during transmission over network 312.

Data object 302 arrives at a consumer application in the form of data object 314. Data object 314 may be unreliable or unauthorized version of data object 302, for example, due to interception or corruption during transmission as described above.

Figure 4:
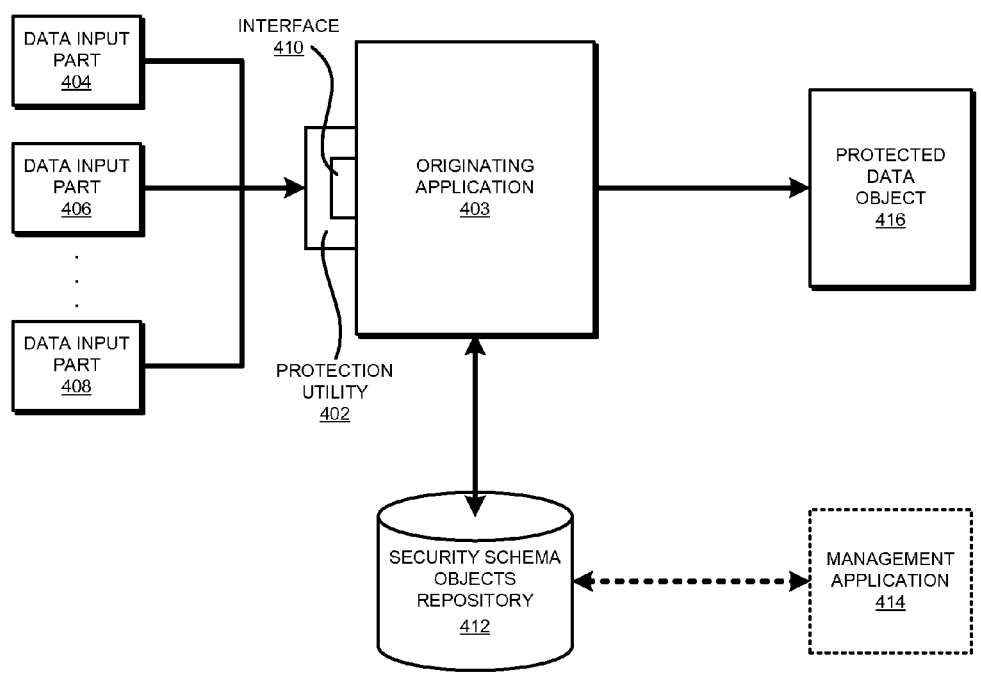
FIG. 4 depicts a block diagram of a security configuration for providing consistent cryptographic operations in a data processing environment using protected structured data objects in accordance with an illustrative embodiment.

With reference to FIG. 4, this figure depicts a block diagram of a security configuration for providing consistent cryptographic operations in a data processing environment using protected structured data objects in accordance with an illustrative embodiment. Protection utility 402 is an application implemented in any suitable form. For example, protection utility 402 is usable as utility 107 in FIG. 1. For example, an embodiment of protection utility 402 is a security plug-in coupled with originating application 403 as shown. The term "plug-in" is used to describe a set of software components that adds specific abilities to a larger software application. For example, plug-ins are commonly used in web browsers to play video, scan for viruses, and display new file types. Thus, in one embodiment of the invention, a security plug-in can be added to an application to perform the cryptographic operations associated with creating, validating, and restoring secure structured data objects.

Data input parts 404, 406, and 408 are each data to be included in a structured data object. Data input parts 404-408 may be any number of such data. Furthermore, data input parts 404-408 can each come from different sources and can be of any type without limitation. For example, in one embodiment, a user provides data input part 404, an application provides data input part 406, and data input part 408 is computed.

Any type of data is usable in the manner of any of data input parts 404, 406, or 408, and any number thereof without limitation. For example, any of data input parts 404-408 can be plain text data from a user, a data structure parameter provided by an application, XML data received over a network, Standard Generalized Markup Language (SGML) document produced from a server, or a query code generated by a database. As some more examples, a data input usable as data input part 404, 406, or 408 can be a text or binary file encrypted using a public key in key pair cryptography, a key usable for encryption or decryption, a certificate usable for authentication, data having a checksum, or a seed value for cryptographic key generation.

The sources of data input parts 404-408 provide data input parts 404-408 to protection utility 402 via interface 410. Interface 410 can take the form of a user interface or an application interface, such as an API.

Protection utility 402 communicates with repository 412. Repository 412 may be any type of data storage configurable to store security schema objects. In one preferred embodiment, repository 412 is part of the protection utility plug-in.

A security schema is an organization of information that is usable for determining an organization structure or layout of data, identifying parts of data, and transformations applicable to the data or parts thereof. The security schema object in the present invention is an instance of a security schema which is associated with one or more secure structured data objects.

A security schema object further includes rules applicable in performing the transformations, such as a series or sequence of cryptographic operations, and other considerations in applying the rules or transformations to all or part of the data. The security schema also defines steps or data flow usable for processing the data, or a combination thereof.

Within a security schema object, a cryptographic operation in the sequence of cryptographic operations is performed by a component of the security plug-in, or by the plug-in calling another utility to accomplish the operation. As an example, a sequence of cryptographic operations includes pre-processing of data and an encryption method to be used with that data. In one embodiment, the sequence of cryptographic operations further includes a method of using an external service, such as a cryptographic key-store. In another embodiment, the cryptographic operations further include a method of validating the encrypted data, and populating a property of a protected data object of which the encrypted data will be a part.

While the security schema describes the organization or arrangement of such a collection of information, a security schema object is an instance, an object, created based on the security schema and populated with specific values of any number of transformations, layouts, data flows, or a combination thereof. The security schema object includes the sequence of cryptographic operations of the corresponding security schema together with the components to perform those operations.

A security schema object is used by the security plug-in on behalf of a cooperating application, including applications that provide the data inputs for creating a protected data object. For example, the layout component of a security schema object is used to pre-apply a sequence of cryptographic operations to the data a source application is supplying for the construction of the protected data object.

Figure 5:
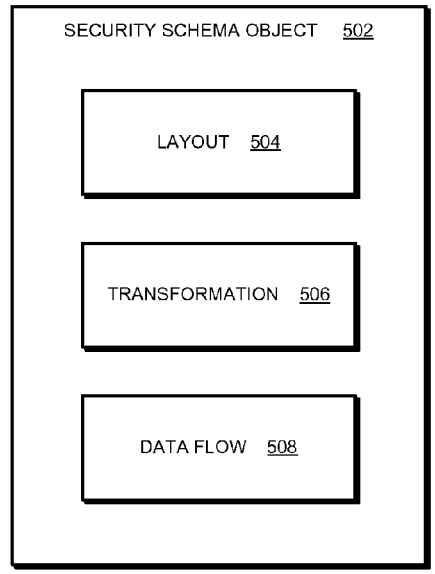
FIG. 5 depicts a block diagram of an example context in accordance with an illustrative embodiment.

A transformation specified in a security schema object, as described in detail with respect to FIG. 5, can be applied to any data input part for a structured data object, such as to any of data input parts 404-408.

Optionally, security schema objects repository 412 may have associated therewith management application 414. Management application 414 facilitates creation of new security schema objects and manipulation of existing security schema objects.

Using data input parts 404-408, and one or more security schema objects from repository 412, protection utility 402 produces protected data object 416. Protected data object 416 is a structured data object that includes one or more security measures associated with one or more parts of the structured data object. In applying a security measure to a part of protected data object 416, protection utility 402 uses services and data from other applications or data processing systems (not shown).

Protected data object 416 references the associated one or more security schema objects used in protected data object 416's creation. In one embodiment, this referencing is accomplished by including the one or more security schema objects within protected data object 416 as properties of protected data object 416. For example, in an embodiment, protected data object 416 includes not only the structured data resulting from applying the contents of a security schema object to data input part 404, but also the security schema object itself.

In another embodiment, referencing a security schema object from protected data object 416 is accomplished by storing a reference within protected data object 416, the reference pointing or leading to the security schema object stored external to protected data object 416. For example, in an embodiment, protected data object 416 includes not only the structured data resulting from applying the contents of a security schema object to data input part 406, but also an address to locate the security schema object used.

When a receiver unpacks protected data object 416 to recover data input part 406, the address is utilized to retrieve the associated security schema object from another location in a data processing environment, such as over a data network. In such an embodiment, the address referencing the externally stored security schema object is a property of protected data object 416.

Note that an embodiment can include a combination of types of references to different security schema objects. For example, in an embodiment, protected data object 416 includes transformed version of data input part 404, the security schema object usable for recovering data input part 404, transformed version of data input part 406, and a reference to an externally stored security schema object usable for recovering data input part 406.

With reference to FIG. 5, this figure depicts a block diagram of an example security schema object in accordance with an illustrative embodiment. Security schema object 502 is a security schema object in repository 412 in FIG. 4 that protection utility 402 in FIG. 4 uses in the manner described there. An example security schema object 502 is depicted as including layout component 504, transformation component 506, and data flow component 508.

Generally, layout component 504 specifies the steps needed to parse or assemble the data input for a given structured object. In one preferred embodiment, layout component 504 provides a normalized data structure into which the raw data input, such as data input parts 404-408 in FIG. 4, must be arranged.

The security schema object also includes one or more transformation components 506 applicable to one or more parts of the structured data object. Generally, transformation component 506 specifies the steps needed to transform the structured data object into a corresponding secure form. For example, a part of the structured data object in the layout format may have to be transformed through encryption using a particular encryption algorithm for the final format creating the secure structured data object.

Different transformations can be applied to different data inputs. More than one transformation can be applied to a given data input. For example, a transformation can be applied to unstructured data that is to be included in a structured data object. In another embodiment, a transformation applies to data that is unprotected by any security measure. In another embodiment, a transformation applies to data that is already protected using some security measure. Without limiting an embodiment of the invention there to, some examples of possible transformations are—encrypting unencrypted data, decrypting encrypted data and then re-encrypting with a different encryption, signing unsigned data, signing previously signed data with a different signature, encoding data according to an agreed encoding scheme, compressing data, recompressing already compressed data using a different compression or encoding, translating data from one encoding to another, and replacing data with a reference to the data For example, assume that data input part 404 in FIG. 4 is secured using one security measure. A transformation in an object protection descriptor operates on data input part 404 in FIG. 4 such that upon transformation, data input part 404 in FIG. 4 is protected using a different security measure. In one example, data input part 404 in FIG. 4 encrypted using one algorithm can thus be transformed into encrypted data using a different encryption algorithm. In another example, data input part 404 in FIG. 4 signed with one certificate can thus be transformed to become data signed using a different certificate.

Furthermore, transformation component 506 in a security schema object 502 can include any number of steps, operations, or processes. For example, in one embodiment, for transforming an encrypted data to a differently encrypted data, a transformation employs an intermediate decryption step within the scope of the invention.

In one preferred embodiment, security schema object 502 further includes a rule in conjunction with the transformation 506, specifying the conditions under which the transformation 506 should be applied. For example, in one embodiment, the rule specifies that transformation 506 should use an alternative encryption algorithm if the size of the data part exceeds a threshold size.

Security schema object 502 also includes component 508, which describes a data flow. Generally, data flow component 508 orders the layout and transformation steps specified by layout component 504 and transformation component 506 respectively.

In a preferred embodiment, a data flow according to data flow component 508 is a sequencing of actions, operations, occurrences, conditions, or manipulations. However, the data flow is not limited to only those actions, operations, occurrences, conditions, or manipulations specified in the object protection descriptor, but may also correlate them with actions, operations, occurrences, conditions, or manipulations elsewhere in a data processing environment.

For example, in one embodiment, a data flow consideration is that the transformation using the encryption algorithm should occur only if another part of the structured data object has been successfully transformed prior to the transformation.

Any number of layout 504, transformation 506, and data flow 508 components can be present in security schema object 502 without limitation on the illustrative embodiment. For example, all of the layout operations can be included in a single layout component, or each layout operation can be included in a separate layout component. A set of layout is zero or more layouts. A set of transformation is zero or more transformations. A set of data flow is zero or more data flow. Transformation 506 describes an output format or value of the data being transformed. Layout 504 describes a normalized input format. Data flow 508 describes a sequence of cryptographic operations to be followed when using security schema object 502.

Security schema object 502 includes at least one each of layout 504, transformation 506, and data flow 508 components. For example, in one embodiment, security schema object 502 includes one layout 504 describing a structured data object, and several transformations 506 applicable to various parts of the structured data object needed to create the secure structured data object. In another embodiment, security schema object 502 includes the first example security schema object information and one or more additional layout 504, transformation 506, and data flow 508 components.

In another embodiment, security schema object 502 includes one layout 504 one transformation 506, and one data flow 508, such that security schema object 502 in this form can be called from, referenced from, associated with, or usable with another security schema object.

Figure 6:
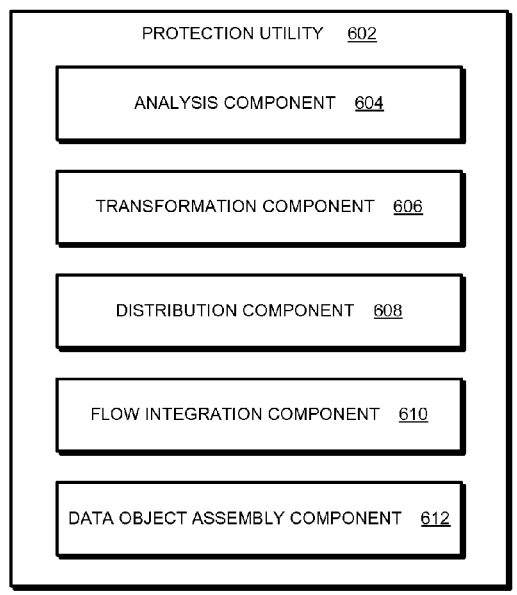
FIG. 6 depicts a block diagram of an example configuration of a protection utility in accordance with an illustrative embodiment.

With reference to FIG. 6, this figure depicts a block diagram of an example configuration of a protection utility in accordance with an illustrative embodiment. Protection utility 602 can be used as protection utility 402 in FIG. 4.

In the depicted example configuration, protection utility 602 includes analysis component 604, transformation component 606, distribution component 608, flow integration component 610, and data object assembly component 612. Analysis component 604 analyzes a data input part being provided by a source, a security schema object received from a security schema object repository, and other inputs, such as administrative or data-security policies, for creating a structured data object. In one embodiment, analysis component 604 pre-processes or otherwise further manipulates information, such as a data part or a security schema object.

Transformation component 606 performs the transformations according to a security schema object. In one embodiment, transformation component 606 communicates with other applications or data processing system, such as to receive rules, policies, or other information usable in performing a transformation.

Generally, any operation performed in protection utility 602 can be distributed to or coordinated with other applications or data processing system. Distribution component 608 enables protection utility 602 in so distributing or coordinating the operations.

For example, in one embodiment, for performing a signing transformation, transformation component 606 communicates with a certificate database located elsewhere in a data processing environment to receive information of a certificate. Continuing with the signing transformation example, transformation component 608 can further communicate with a third party certificate authority (CA) to determine the validity of the certificate prior to using the certificate.

In another embodiment, analysis component 604 distributes one or more analysis tasks to other processors in a distributed computing environment. The example communication and distribution are not intended to be limiting on the invention. Many other communications and distributions are going to be apparent from this disclosure and the same are contemplated within the scope of the invention.

Flow integration component 610 coordinates the operations of protection utility 602 with any data flow or work flow specified in a given security schema object. For example, in one embodiment, flow integration component 610 causes an analysis operation to wait for a transformation operation to complete successfully.

As another example, a work flow in a business data processing environment may require a notification when a certain transformation fails. In an embodiment, flow integration component 610 causes a message to be sent to the work flow engine in the data processing environment for such work flows to execute correctly. Generally, any data dependency or condition can be encoded into a data flow and can be processed by flow integration component 610 in this manner.

In an embodiment, protection utility 602 analyzes, transforms, and integrates various parts of a structured data object separately. For example, in such an embodiment, protection utility 602 analyzes and transforms a data input part individually.

Upon a certain trigger or event, such as all parts having been successfully transformed, protection utility assembles the structured data object from those parts including associated security schema objects or references thereto as properties of the structured data object. Data object assembly component 612 facilitates the assembly of the structured data object according to a specification such as XML or another proprietary or standard specification.

Figure 7:
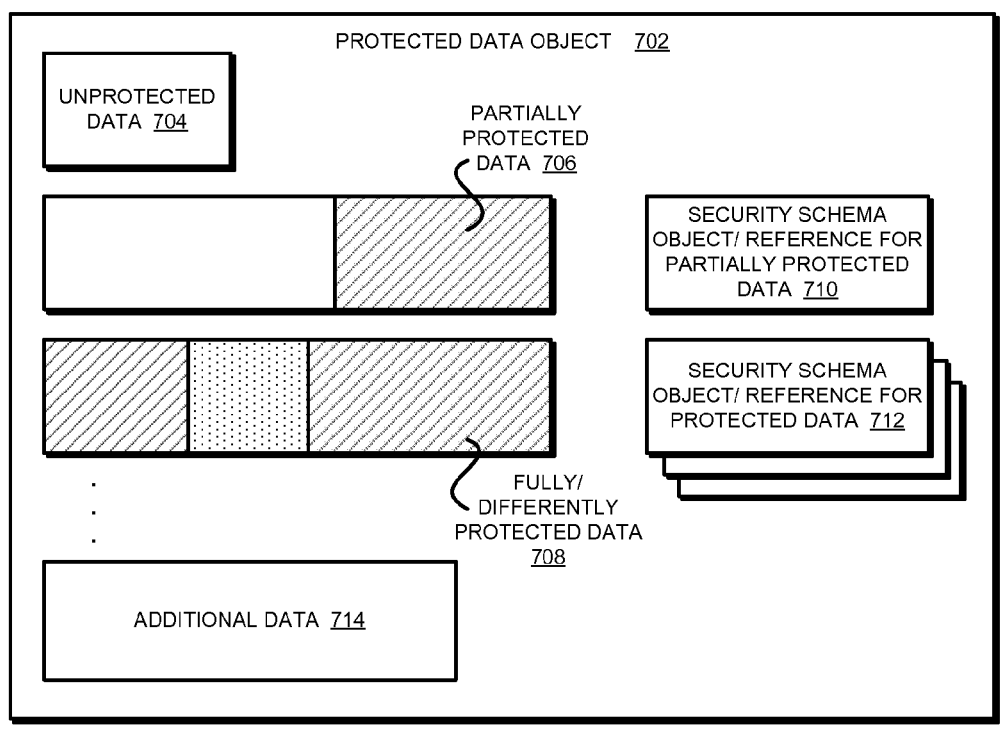
FIG. 7 depicts a block diagram of an example protected data object in accordance with an illustrative embodiment.

With reference to FIG. 7, this figure depicts a block diagram of an example protected data object in accordance with an illustrative embodiment. Protected data object 702 is usable as protected data object 416 in FIG. 4.

Protected data object 702 is a secure structured data object, and includes a combination of protected data and unprotected data. Unprotected data 704 is an example of unprotected data in protected data object 702. Data 706 and 708 are examples of protected data.

In one embodiment, data 706 is partially protected. For example, data 706 may be a data structure, and only some of the elements of the data structure are transformed to be protected, such as by encryption.

Data 708 may be another part of protected data object 702. Data 708 may be fully protected. Furthermore, data 708 can be protected differently than data 706. For example, in one embodiment, one part of data 708 is signed with one certificate, another part with another certificate, and a third part of data 708 is encrypted, the encryption being different from the encryption used in data 706.

Furthermore, protected data object 702 includes a security schema object usable for recovering the protected data at the consumer of the structured data object. For example, in one embodiment, protected data object 702 includes security schema object 710. Security schema object 710 is usable for restoring a protected data within protected data object 702, such as protected data 706.

Protected data object 702 can include any number of such security schema objects, references to security schema objects, or a combination thereof. For example, one or more of security schema objects 712 may be nested within a larger security schema object, which is usable for restoring the various parts of data 708 to their original form.

Protected data object 702 can also include additional data usable for processing the structured data object. For example, in an embodiment, additional data 714 is usable for verifying the integrity of one or more protections or security measures employed within protected data object 702. In one embodiment, additional data 714 is a context that was used in creating protected data object 702.

Figure 8:
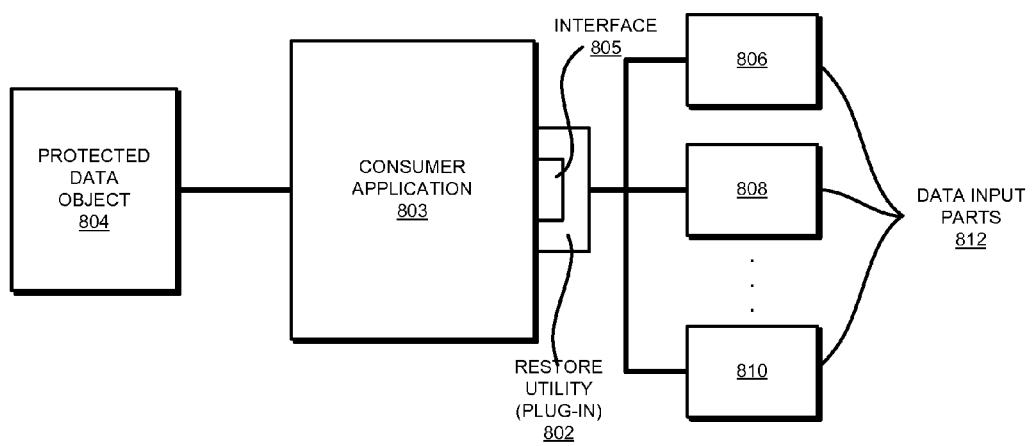
FIG. 8 depicts a block diagram of an example configuration of a protection utility in accordance with an illustrative embodiment.

With reference to FIG. 8, this figure depicts a block diagram of another utility in accordance with an illustrative embodiment. Restore utility 802 may be a component of an application, and may take any form suitable for an implementation. Restore utility 802 is usable in conjunction with an application that consumes secure structured data objects, for example, application 113 in client 112 in FIG. 1. An embodiment of restore utility 802 is another security plug-in that can be associated with consumer application 803 using interface 805. An embodiment combines protection utility 402 in FIG. 4 and restore utility 802 into a single plug-in that can be used by a sender application or a consumer application according to their respective needs. Using the protection utility and the restore utility as described herein ensures that cryptographic operations used by the originating and consumer applications are consistent through the use of the same security schema objects.

Restore utility 802 receives protected data object 804. Protected data object 804 is similar to protected data object 702 in FIG. 7. Restore utility 802 performs a validation of protected data object 804. To with, restore utility 802 establishes that protected data object has not been altered, modified, or tampered with, has not been invalidated, or is in the form expected by the consumer application.

Upon successful validation, restore utility 802 applies transformations to various parts of protected data object 804. The transformations restore the protected parts of protected data object 804 to data input parts 812, e.g., as data input parts 806, 808, and 810. Data input parts 806-810 may be any number of data parts.

In one embodiment, data input parts are the original data parts, such as data input parts 404-408 in FIG. 4, that were received from one or more sources to create protected data object 804. In another embodiment, data input parts 806-810 are a variation of such original data input parts suitable for consumption at the consumer application, such as after a post-processing is applied to data input parts 404-408 in FIG. 4 that are recovered from protected data object 804.

Figure 9:
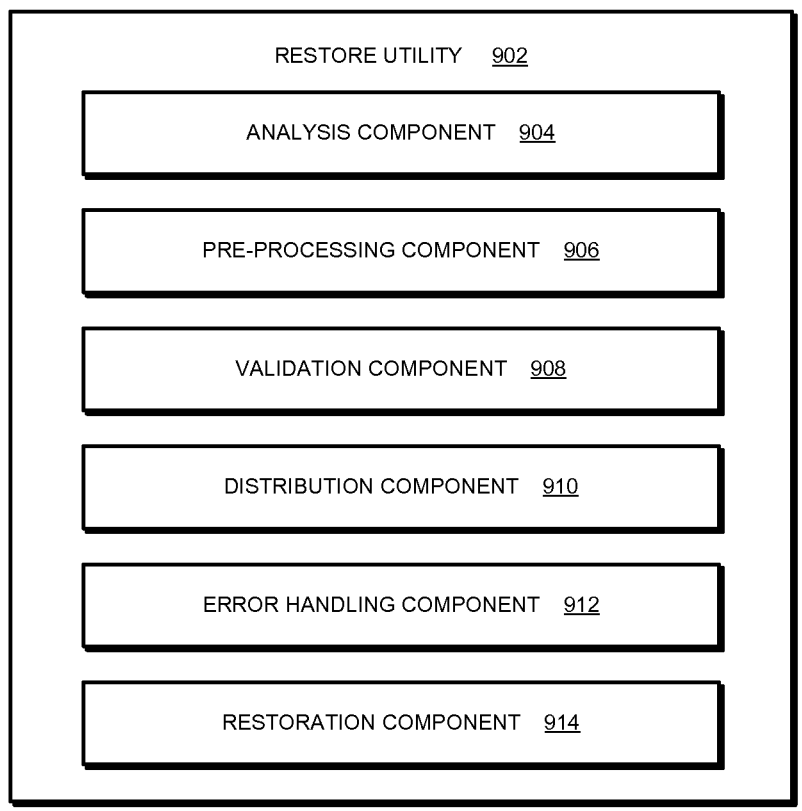
FIG. 9 depicts a block diagram of another utility in accordance with an illustrative embodiment.

With reference to FIG. 9, this figure depicts a block diagram of an example configuration of a restore utility in accordance with an illustrative embodiment. Restore utility 902 may be similar to restore utility 802 in FIG. 8.

Restore utility 902 includes analysis component 904, pre-processing component 906, validation component 908, distribution component 910, error handling component 912, and restoration component 914. Analysis component 904 performs analysis of a secure structured data object or of the secure structured data object's parts as provided by pre-processing component 906. Analysis component 904, with respect to the structured data object and its parts, operates in a manner similar analysis component 604 in FIG. 6.

Pre-processing component 906 processes a received secure structured data object. For example, in one embodiment, a secure structured data object in the form of protected data object 702 in FIG. 7 includes a security schema object in additional data 714 in FIG. 7. Pre-processing component 906 unpacks the protected data object to the extent that the context—the security schema object—is retrieved from the protected data object for further processing of the protected data object. Pre-processing component 906 is used to pre-process a secure structured data object in a similar manner.

Validation component 908 validates the secure structured data object as a whole, protected parts of the secure structured data object, or a combination thereof. Validity of data being validated can be established in any known manner suitable for an implementation without limitation on the invention.

Distribution component 910 distributes one or more operations of restore utility 902 to other applications or data processing systems. Distribution component 910 operates in a manner similar to distribution component 608 in FIG. 6.

Error handling component 912 operates to address any error conditions experienced during an operation of restore utility 902. For example, if validation component 908 generates an event to indicate an invalid secure structured data object, error handling component 912 takes additional actions, such as notifying the sender of the secure structured data object, or attempting to recover from the cause of the invalidity. Any known error handling action can be incorporated into error handling component 912 within the scope of the invention.

Restoration component 914 operates to restore a protected data part of a secure structured data object. In one embodiment, for performing the restore operation, restoration component 914 uses other data parts of the secure structured data object, such as one or more security schema objects that are included as properties of the secure structured data object. Restoration component 914 can also utilize other applications, services, or data, such as an external source of security schema objects using a reference to a security schema object that forms a property of the secure structured data object.

As another example, in another embodiment, for restoring a signed data part, restoration component 914 validates the signing certificate using an external certificate authority. Upon successful validation of the certificate from the certificate authority, restoration component 914 proceeds to restore the signed data part using an included security schema object to a form usable at a consumer application.

Figure 10:
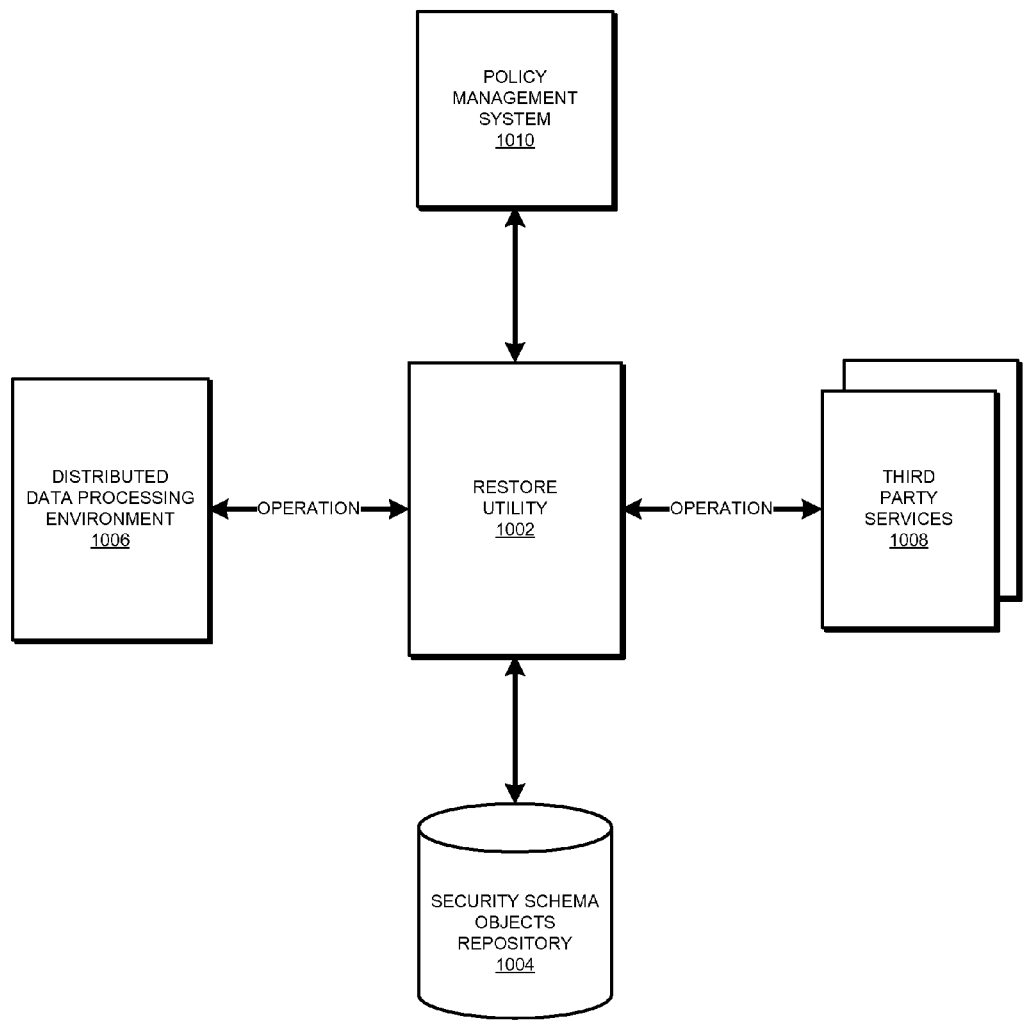
FIG. 10 depicts a block diagram of an example configuration of a restore utility in accordance with an illustrative embodiment.

With reference to FIG. 10, this figure depicts a block diagram of an example configuration of a restore utility in accordance with an illustrative embodiment. Restore utility 1002 is similar to restore utility 902 in FIG. 9.

For performing one or more operations, restore utility 1002 communicates with, or distributes operations to, other systems or applications. For example, in one embodiment, restore utility communicates with security schema object repository 1004, distributed data processing environment 1006, third party services 1008, and policy management system 1010 for performing one or more operations for restoring a secure structured data object.

Figure 11:
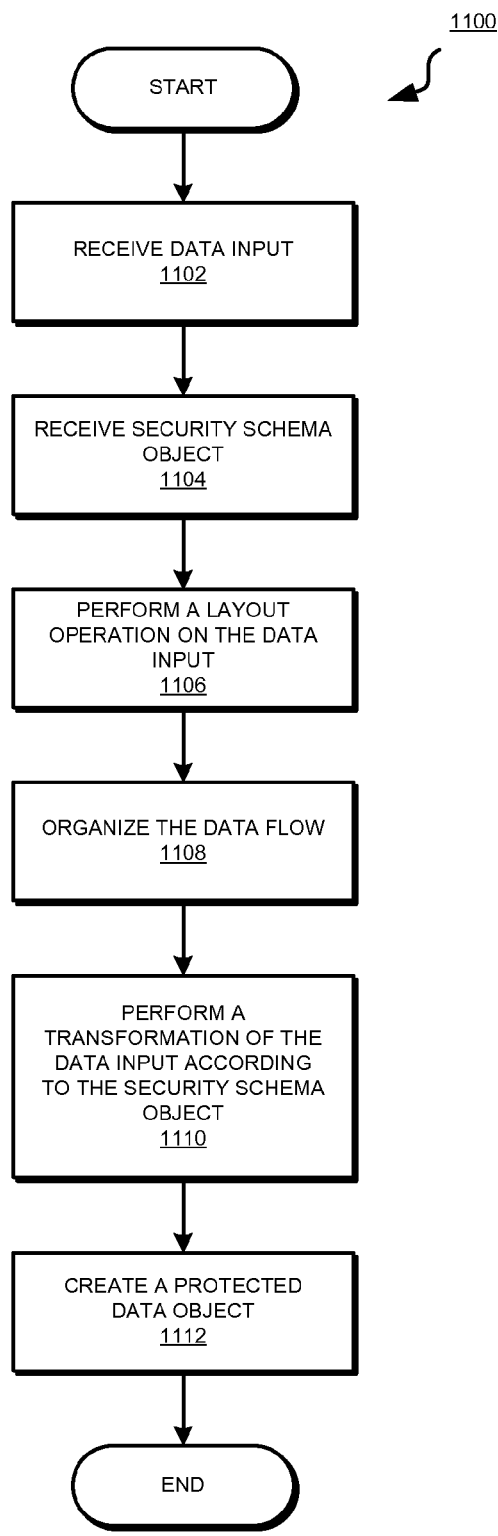
FIG. 11 depicts a block diagram of an example configuration of a restore utility in accordance with an illustrative embodiment.

With reference to FIG. 11, this figure depicts a flowchart of a process of protecting a structured data object in accordance with an illustrative embodiment. Process 1100 is implemented in a protection utility, such as in protection utility 602 in FIG. 6.

Process 1100 begins by receiving a data input (step 1102). Process 1100 receives a security schema object (step 1104). Process 1100 performs a layout operation on the data input of step 1102 (step 1106). Process 1100 organizes the data flow operation as described earlier (step 1108). Process 1100 performs a transformation on the data input according to the security schema object (step 1110). Process 1100 creates a protected data object, such as a secure structured data object, using the transformed data input and the security schema object (step 1112). Process 1100 ends thereafter.

Figure 12:
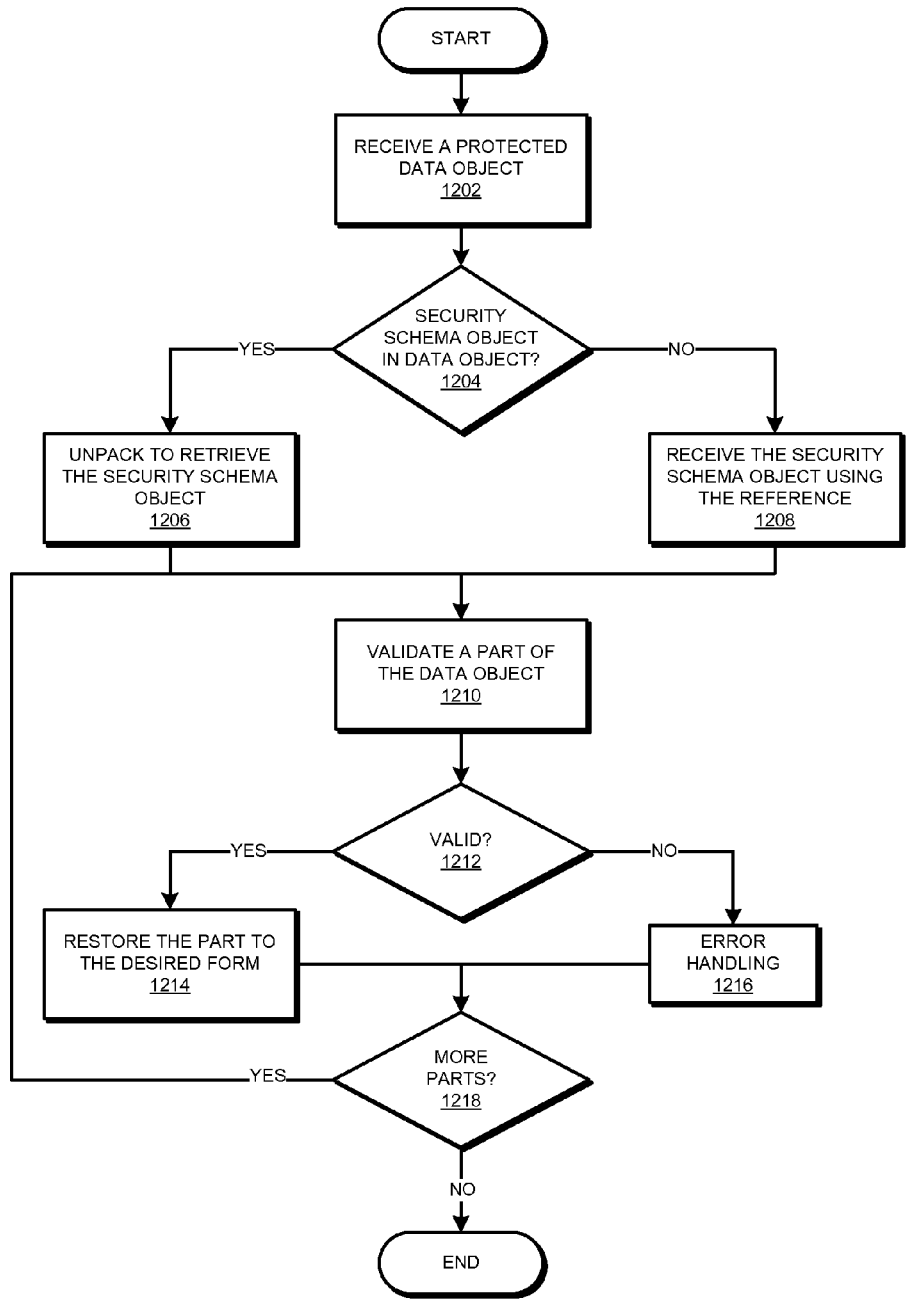
FIG. 12 depicts a flowchart of a process of protecting a structured data object in accordance with an illustrative embodiment.

With reference to FIG. 12, this figure depicts a flowchart of a process of restoring a secure structured data object in accordance with an illustrative embodiment. Process 1200 is implemented in a restore utility, such as in restore utility 1002 in FIG. 10.

Process 1200 begins by receiving a protected data object, such as a secure structured data object (step 1202). Process 1200 determines whether a security schema object accompanies the protected data object (step 1204).

If a security schema object accompanies the protected data object, such as by being included in the protected data object ("Yes" path of step 1204), process 1200 unpacks the protected data object to retrieve the security schema object (step 1206). If a security schema object does not accompany the protected data object by direct inclusion but a reference to the security schema object is included as a property of the protected data object ("No" path of step 1204), process 1200 receives the security schema object, such as by communicating with a security schema object repository using the reference (step 1208).

Process 1200 validates a part of the protected data object (step 1210). In one embodiment, process 1200 validates the protected data object itself in step 1210.

Process 1200 determines whether the validation of the part is successful (step 1212). If the part is successfully validated ("Yes" path of step 1212), process 1200 restores the part to the desired form (step 1214). Process 1200 proceeds to step 1218 thereafter.

If the validation fails ("No" path of step 1212), process 1200 invokes error handling (step 1216). Following error handling in step 1216, in one embodiment, process 1200 may end thereafter. In another embodiment, process 1200 attempts to recover from the error or invalidity (not shown), and proceeds to step 1218.

Process 1200 determines whether more parts in the protected data object have to be restored (step 1218). If more parts have to be restored ("Yes" path of step 1218), process 1200 returns to step 1210. If no more parts of the protected data object have to be restored ("No" path of step 1218), process 1200 ends thereafter. Optionally (not shown), an embodiment of process 1200 also utilizes the layout component of the security schema object utilized in the restoration process to converted normalized form of the restored data to an original form of the data as was supplied as input in the construction of the protected data object.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for providing consistent cryptographic operations in a data processing environment using protected structured data objects. Using the embodiments of the invention, a data processing system can operate with improved efficiency when using secure structured data objects. Using an embodiment, a data processing system or an application can use a utility according to an embodiment to prepare and restore secure structured data objects without having to implement security handling code itself.

A utility according to an embodiment can operate on any form of data input without limitation. A utility according to an embodiment can also produce or restore any form of structured data object, including but not limited to XML implementations of structured data objects.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable device providing program code for use by or in connection with a computer or any instruction execution system. For the purposes of this description, a computer-usable or computer-readable device can be any hardware apparatus that can store the program for use by or in connection with the instruction execution system, apparatus, or device.

The device can be an electronic, magnetic, optical, electromagnetic, or semiconductor system (or apparatus or device). Examples of a computer-readable device include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

Further, a computer storage device may store a computer-readable program code such that when the computer-readable program code is executed on a computer, the execution of this computer-readable program code causes the computer to transmit another computer-readable program code. The terms "computer usable storage device," "computer readable storage device," and "storage device" do not encompass a signal propagation medium, any description in this disclosure to the contrary notwithstanding.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method for providing consistent cryptographic operations in a data processing system, the method comprising:

receiving, by a security plug-in, a data input from an originating application, the originating application and the security plug-in executing in the data processing system;

receiving, by the security plug-in, a security schema object, the first security schema object describing a sequence of cryptographic operations, wherein the sequence includes a cryptographic operation, wherein the security schema object includes a plurality of components each component describing an aspect of the cryptographic operations in the sequence;

transforming, by the security plug-in, a first part of the data input into a first part of a secure structured data object using the sequence of cryptographic operations;

populating a first property of the secure structured data object, separate from the first part of the secure structured data object, with a reference to the security schema object, wherein the reference makes the security schema object available at a consumer application to recover the first part of the data input from the first part of the secure structured data object at the consumer application; and transmitting the secure structured data object to the consumer application.

2. The method of claim 1, wherein the security schema object is used by a plurality of originating applications to provide consistent cryptographic operations in the data processing system.

3. The method of claim 1, further comprising:
receiving the secure structured data object at the consumer application;
retrieving the security schema object according to the first property of the secure structured data object;
validating the secure structured data object by the consumer application using the security schema object and the security plug-in; and
restoring the secure structured data object to the data input using the security schema object and the security plug-in so that cryptographic operations used by the originating application and the consumer application are consistent through the use of the security schema object and the security plug-in.

4. The method of claim 1, wherein the security schema object includes a transformation component, a layout component, and a data flow component.

5. The method of claim 4, wherein the transformation component describes an output format, the layout component describes a normalized input format and the data flow component of the security schema object describes a sequence of cryptographic operations to be followed when using the security schema object.

6. The method of claim 1, wherein populating populates the first property of the secure structured data object with a reference to the security schema object such that the security schema object is retrievable using the reference from a source.

7. The method of claim 1, further comprising:
adding a second security schema object as a second property of the secure structured data object, the second security schema object being usable to validate the secure structured data object at the consumer application.

8. The method of claim 1, wherein receiving the security schema object comprises:
identifying the security schema object in a security schema object repository; and
retrieving the security schema object from the security schema object repository.

9. The method of claim 1, wherein the security schema object is a plurality of security schema objects, a security schema object in the plurality of security schema objects being applicable to the first part of the data input.

10. The method of claim 1, wherein the first part of the data input is protected using one security measure, and the transformation is protecting the first part of the data input using a different security measure.

11. The method of claim 1, further comprising:
receiving a policy, wherein the policy modifies the transformation according to the security schema object; and
modifying the transformation according to the policy.

12. A computer usable program product comprising a computer usable storage device including computer usable code for providing consistent cryptographic operations in a data processing system, the computer usable code comprising:
computer usable code for receiving, by a security plug-in, a data input from an originating application, by the originating application and the security plug-in executing in the data processing system;
computer usable code for receiving, by the security plug-in, a security schema object, the first security schema object describing a sequence of cryptographic operations, wherein the sequence includes a cryptographic operation, wherein the security schema object includes a plurality of components each component describing an aspect of the cryptographic operations in the sequence;
computer usable code for transforming, by the security plug-in, a first part of the data input into a first part of a secure structured data object in using the sequence of cryptographic operations;
computer usable code for populating a first property of the secure structured data object, separate from the first part of the secure structured data object, with a reference to the security schema object, wherein the reference makes the security schema object available at a consumer application to recover the first part of the data input from the first part of the secure structured data object at the consumer application; and
computer usable code for transmitting the secure structured data object to the consumer application.

13. The computer usable program product of claim 12, wherein the security schema object is used by a plurality of originating applications to provide consistent cryptographic operations in the data processing system.

14. The computer usable program product of claim 12, further comprising:
computer usable code for receiving the secure structured data object at the consumer application;
computer usable code for retrieving the security schema object according to the first property of the secure structured data object;
computer usable code for validating the secure structured data object by the consumer application using the security schema object and the security plug-in; and
computer usable code for restoring the secure structured data object to the data input using the security schema object and the security plug-in so that cryptographic operations used by the originating application and the consumer application are consistent through the use of the security schema object and the security plug-in.

15. The computer usable program product of claim 12, wherein the security schema object includes a transformation component, a layout component, and a data flow component.

16. The computer usable program product of claim 15, wherein the transformation component describes an output format, the layout component describes a normalized input format and the data flow component of the security schema object describes a sequence of cryptographic operations to be followed when using the security schema object.

17. The computer usable program product of claim 12, wherein populating populates the first property of the secure structured data object with a reference to the security schema object.

18. The computer usable program product of claim 12, wherein the computer usable code for receiving a data input, the computer usable code for receiving the security schema, the computer usable code for transforming the first part, the computer usable code for transforming the second part, the computer usable code for populating, and the computer usable code for transmitting are stored in a first computer readable storage device in a data processing system, and wherein the computer usable code for receiving a data input, the computer usable code for receiving the security schema, the computer usable code for transforming the first part, the computer usable code for transforming the second part, the computer usable code for populating, and the computer usable code for transmitting are transferred over a network from a remote data processing system.

19. The computer usable program product of claim 12, wherein the computer usable code for receiving a data input, the computer usable code for receiving the security schema, the computer usable code for transforming the first part, the computer usable code for transforming the second part, the computer usable code for populating, and the computer usable code for transmitting are stored in a first computer readable storage device in a server data processing system, and wherein the computer usable code for receiving a data input, the computer usable code for receiving the security schema, the computer usable code for transforming the first part, the computer usable code for transforming the second part, the computer usable code for populating, and the computer usable code for transmitting are download over a network to a remote data processing system for use in a second computer readable storage device associated with the remote data processing system.

20. A data processing system for providing consistent cryptographic operations, the data processing system comprising:
 a storage device, wherein the storage device stores computer usable program code; and
 a processor, wherein the processor executes the computer usable program code, and wherein the computer usable program code comprises:
  computer usable code for receiving, by a security plug-in, a data input from an originating application, the originating application and the security plug-in executing in the data processing system;
  computer usable code for receiving, by the security plug-in, a security schema object, the first security schema object describing a sequence of cryptographic operations, wherein the sequence includes a cryptographic operation, wherein the security schema object includes a plurality of components each component describing an aspect of the cryptographic operations in the sequence;
  computer usable code for transforming, by the security plug-in, a first part of the data input into a first part of a secure structured data object using the sequence of cryptographic operations;
  computer usable code for populating a first property of the secure structured data object, separate from the first part of the secure structured data object, with a reference to the security schema object, wherein the reference makes the security schema object available at a consumer application to recover the first part of the data input from the first part of the secure structured data object at the consumer application; and
  computer usable code for transmitting the secure structured data object to the consumer application.

* * * * *